United States Patent
Giemza et al.

(10) Patent No.: US 9,440,808 B2
(45) Date of Patent: Sep. 13, 2016

(54) SLIDING LOADING RAMP

(71) Applicant: Randall Manufacturing LLC, Elmhurst, IL (US)

(72) Inventors: Adam Giemza, Carol Stream, IL (US); Fred Jevaney, Elmhurst, IL (US)

(73) Assignee: Randall Manufacturing, Elmhurst, IL (US)

( * ) Notice: Subject to any disclaimer, the term of this patent is extended or adjusted under 35 U.S.C. 154(b) by 204 days.

(21) Appl. No.: 13/838,157

(22) Filed: Mar. 15, 2013

(65) Prior Publication Data

US 2014/0271100 A1    Sep. 18, 2014

(51) Int. Cl.
*B60P 1/00* (2006.01)
*B65G 69/30* (2006.01)

(52) U.S. Cl.
CPC ..................... *B65G 69/30* (2013.01)

(58) Field of Classification Search
CPC .. B65G 67/02; B65G 69/30; B65G 69/2829; B60P 1/435; B60P 1/43; A61G 3/061; B63B 2027/141; B63B 27/143
See application file for complete search history.

(56) References Cited

U.S. PATENT DOCUMENTS

| | | | |
|---|---|---|---|
| 5,536,058 A * | 7/1996 | Otis .................................. | 296/61 |
| 5,803,523 A * | 9/1998 | Clark et al. .................. | 296/26.1 |
| 5,813,071 A * | 9/1998 | Breslin et al. ................. | 14/71.1 |
| 6,431,815 B1 | 8/2002 | Zarzecki et al. | |
| 6,536,064 B1 | 3/2003 | Swink et al. | |
| 7,100,232 B2 | 9/2006 | Zhang | |
| 7,488,025 B1 * | 2/2009 | Roberson ......................... | 296/61 |
| 7,533,923 B1 * | 5/2009 | Caldwell ......................... | 296/61 |
| 7,549,692 B2 * | 6/2009 | Washington ..................... | 296/61 |
| 7,810,196 B1 | 10/2010 | Pritchard et al. | |
| 7,827,641 B2 * | 11/2010 | Hoffman et al. .............. | 14/69.5 |
| 7,966,685 B2 | 6/2011 | Van Beek | |
| 8,079,798 B2 | 12/2011 | Smith et al. | |
| 2006/0288501 A1 * | 12/2006 | Thygesen ....................... | 14/69.5 |
| 2008/0263790 A1 * | 10/2008 | Hoffman ................ | B65G 69/30 14/71.1 |
| 2010/0266378 A1 * | 10/2010 | Verwys ......................... | 414/537 |

* cited by examiner

*Primary Examiner* — Saul Rodriguez
*Assistant Examiner* — Mark Hageman
(74) *Attorney, Agent, or Firm* — Brinks, Gilson and Lione (57) ABSTRACT

A sliding ramp can include at least two platforms. The platforms of the sliding ramp can be slidably connected to provide a storage position and an operational position. The platforms can include male and female members. The male and female members can facilitate the slidable relationship between the two platforms.

10 Claims, 10 Drawing Sheets

SLIDING LOADING RAMP

BACKGROUND

In the loading and unloading of trucks, a ramp is often used to span the distance from the truck trailer to the ground surface. Similarly, a ramp is also used to span the distance from a dock surface to the ground surface. These ramps allow, for example, the trailer to be unloaded by providing a walking surface from the trailer down to the ground. The surface of the ramp also allows unloading dollies or hand-trucks to be used in unloading the contents of the trailer.

Some truck trailers are specially equipped to transport a variety of items requiring different storage temperatures. For example, truck trailers known as "multi-temp" trailers may be equipped with non-refrigerated, refrigerated and freezer compartments. Each of these compartments must be equipped with an access area for loading and unloading. This access area is typically provided in the form of a door located on the side of the trailer. A ramp is often used to span the distance from each of the side doors down to the ground surface. In using a ramp to unload these trailers, it is sometimes necessary to move the ramp from one side door to another as the various compartments are unloaded. Trailers can also be provided with an access door at the rear of the trailer for loading and unloading.

Historically, prior art ramps are unitary, rigid structures that have lengths sufficient to span the distance from the trailer surface to the ground at an angle that allows the trailer to be unloaded safely and comfortably. Prior art ramps have addressed some of the problems associated with unitary, rigid ramps by incorporating a hinge to allow the ramp to fold into a more compact position for stowing. See for example U.S. Pat. No. 6,536,064 and U.S. Provisional Application No. 61/584,116, the entirety of which are herein incorporated by reference. While an improvement, folding ramps have drawbacks. For example, lifting a section of the ramp and rotating it about a pivot point can require a great deal of strength. The potential energy contained in a folding ramp, when it is at its highest point during unfolding, makes the ramp dangerous to nearby people and things. Further, maneuvering a ramp with a hinged axis at or near its midpoint can be awkward and/or dangerous due the possibility of pinched fingers.

There is a need in the art for a product that addresses these and/or other issues and shortcomings of the prior art.

BRIEF SUMMARY

In one aspect, a sliding ramp can include a first platform and a second platform. The second platform can be slidably coupled to the first platform. The second platform can be adapted to slide relative to the first platform between a storage position and an extended position. The second platform can overlie the first platform.

In some embodiments, the sliding ramp can further include one or more leg support structures that can be coupled to the first and/or second platforms. A leg support structure can include a pair of spaced, substantially parallel tubing members. Each tubing member can have a wheel coupled to the leg support structure. The wheel can be slidably and/or retractably coupled to the leg support structure.

In another aspect, a sliding ramp can include a first platform having first and second ends, and a second platform having first and second ends. The first platform can be coupled to the second platform. The platforms can be configured to facilitate an extended position in which the first end of the first platform is adjacent the second end of the second platform. The platforms can be configured to further facilitate a storage position in which the first end of the first platform is adjacent the first end of the second platform.

In some embodiments the sliding ramp can further include a leg support structure that can be coupled to one of the first or second platforms. The leg support structure can further include a pair of spaced, substantially parallel tubing members. The tubing members can have wheels, or casters, coupled to the leg support structures. The wheel can be slidably and retractably coupled to a leg support structure.

Other aspects, embodiments, and features will be apparent from the following description, the drawings, and the claims.

DETAILED DESCRIPTION

The various exemplary embodiments described are not intended to be limiting, but rather, instructive to one of ordinary skill in the art.

Figure 1:
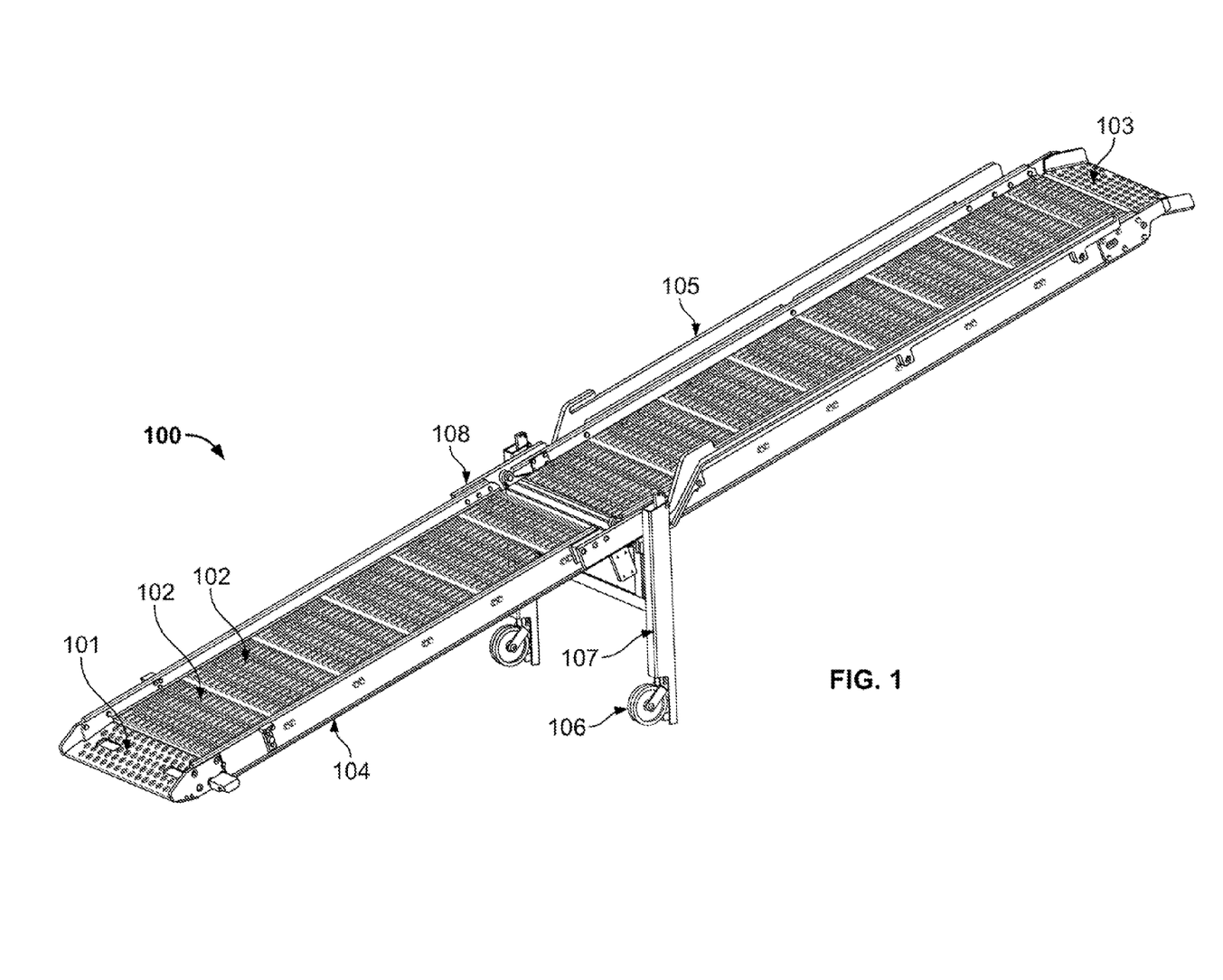
FIG. 1 depicts a first embodiment of a sliding ramp in an operation configuration.
Figure 2:
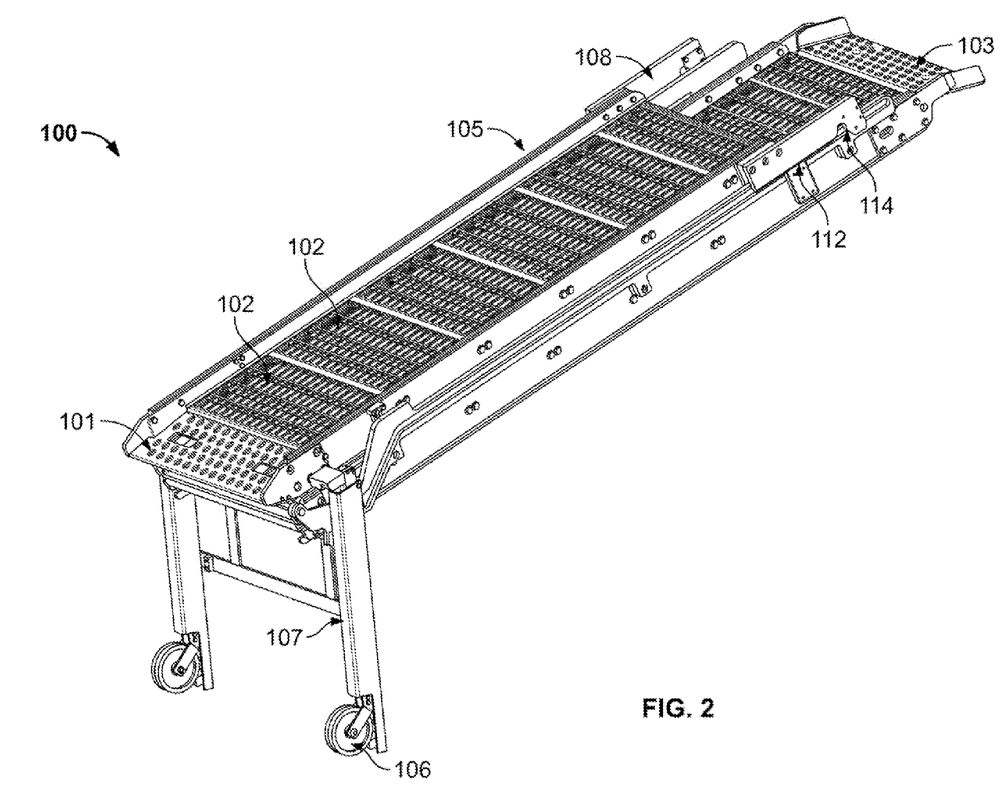
FIG. 2 depicts a first embodiment of a sliding ramp in an intermediate configuration.
Figure 3:
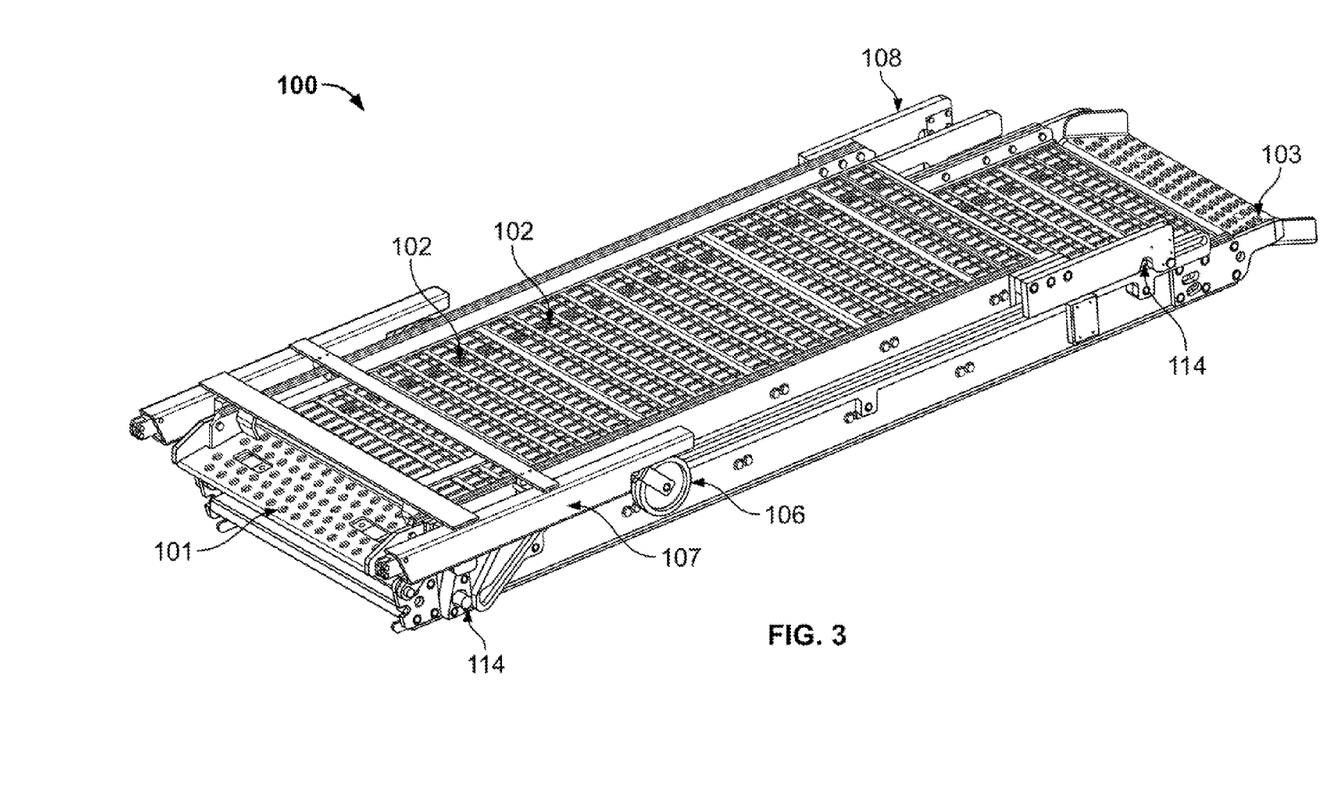
FIG. 3 depicts a first embodiment of a sliding ramp in a storage configuration.

A first embodiment is shown in FIG. 1. The sliding ramp can have a first platform attached to an apron (103) or lip. The sliding ramp (100) can have a foot plate (101) attached to a second platform. Each platform can include a series of ramp panels (102) and side rails (104). Each ramp panel can be an extruded panel, a casted grate, and/or other functionally equivalent panels. The first platform can include a guide plate (105) on each side, and the second platform can include a mounting block (108) on each side. The guide plate and mounting block can be configured to slidably couple the first and second platforms. The first platform can be adapted to slide relative to the first platform between a storage position, as shown in FIG. 3, and an extended position, as shown in FIG. 1.

In some embodiments the sliding ramp can further include one or more leg support structures (107) that can be coupled to the first and/or second platforms. A leg support structure can include a pair of spaced, substantially parallel tubing members. Each tubing member can have a wheel (106) coupled to the leg support structure. The wheel can be slidably and/or retractably coupled to the leg support structure.

Figure 4:
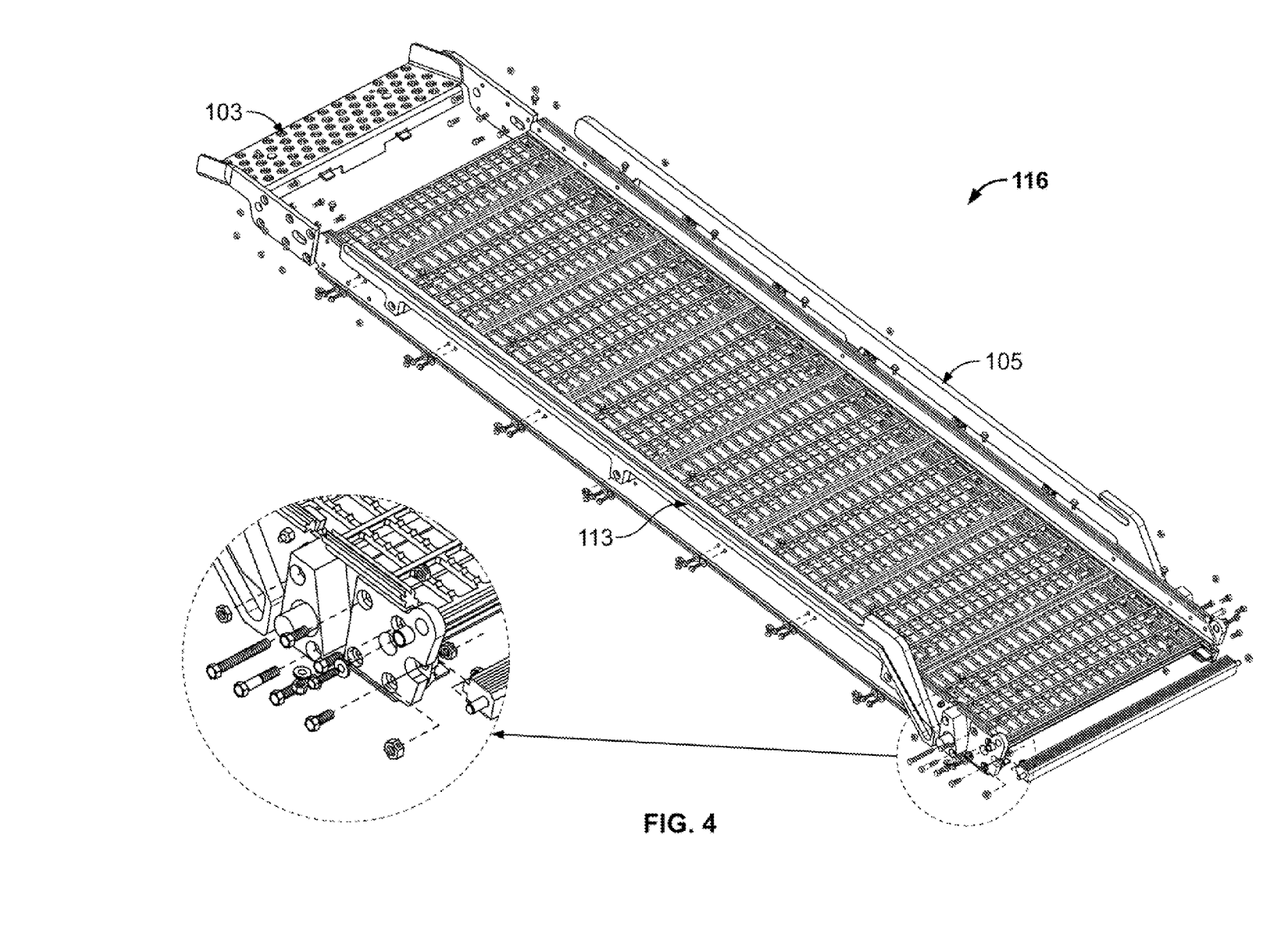
FIG. 4 depicts an exemplary upper section of a first embodiment of a sliding ramp.

An exemplary first platform (116) is shown in FIG. 4. The first platform can have an apron (103) that can engage a floor, for example the floor of a cargo trailer. The first platform can have one or more female members, such as guide plates (105) that can be mounted to the side rails (104). The guide plate can include a groove (113) that can accept a male member that can be attached to the second platform, such as the mounting block (108) described below. The guide plates can be attached to the side rails by any suitable means, including bolted on.

Figure 5:
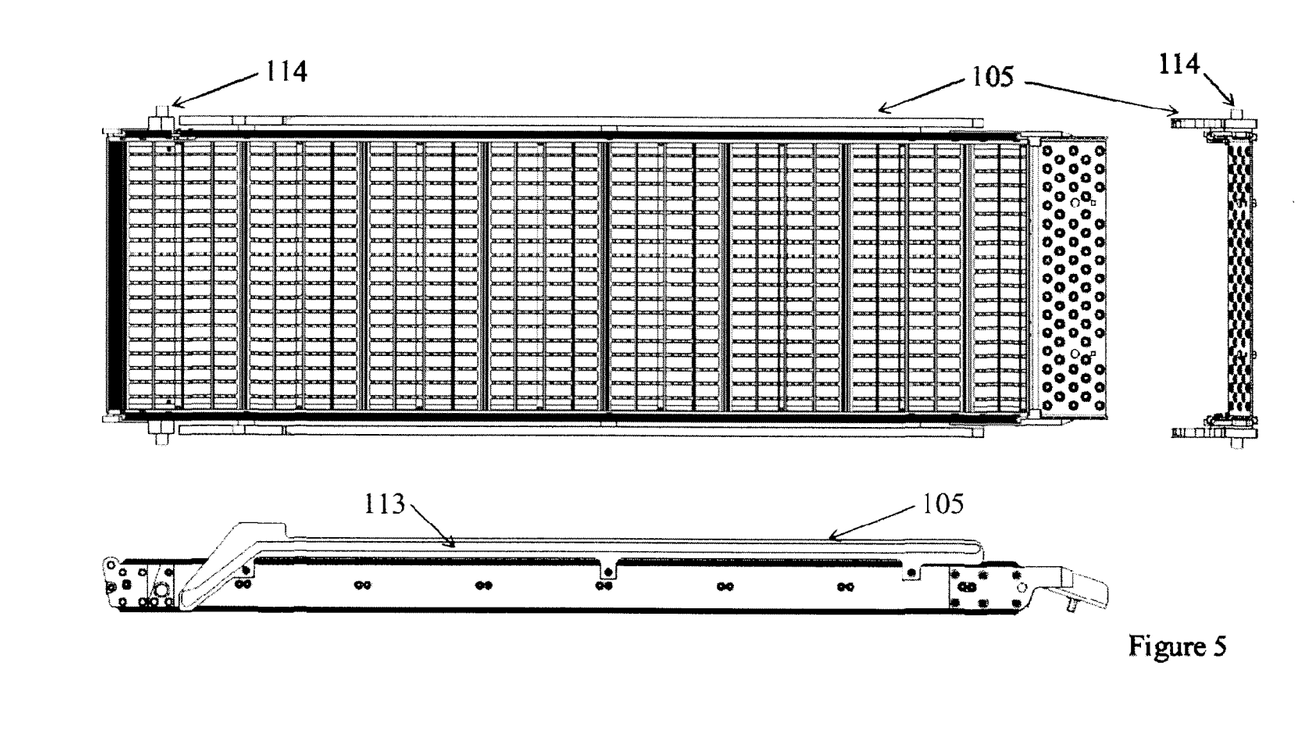
FIG. 5 depicts top, side, and longitudinal views of an exemplary upper section of a first embodiment of a sliding ramp.

FIG. 5 shows overhead, side, and longitudinal views of the exemplary first platform of FIG. 4. The first platform can further include a ramp post (114) located adjacent an end of the groove (113). The ramp post (114) can be bolted and/or welded to the first platform. As is shown, except for a tapered end, the guide plates (105) can extend above the work surface of the first platform.

Figure 6:
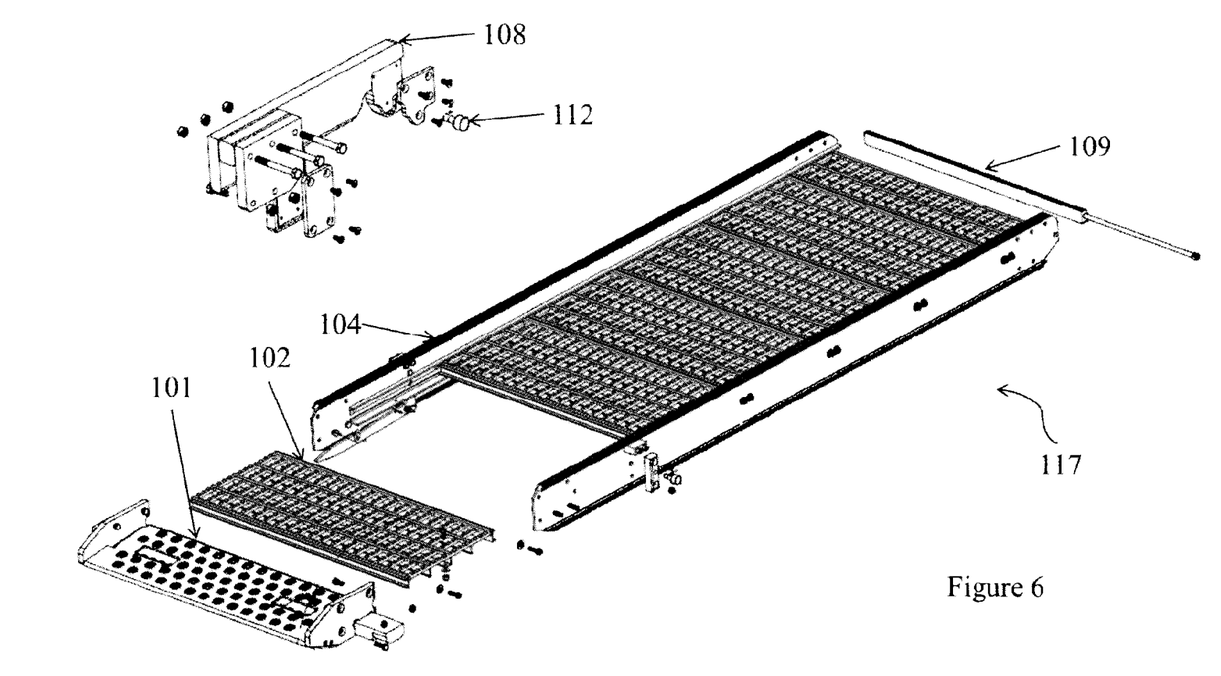
FIG. 6 depicts an exemplary lower section of a first embodiment of a sliding ramp.
Figure 7:
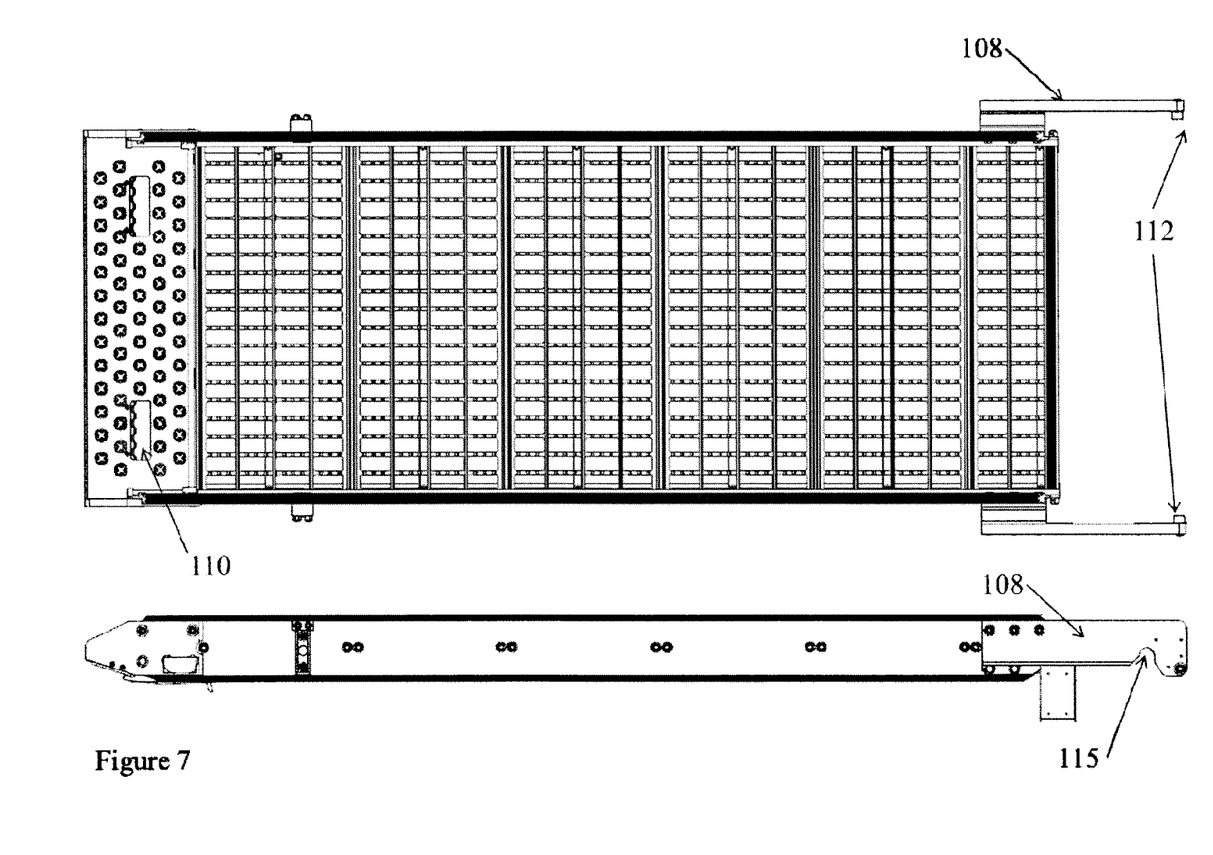
FIG. 7 depicts top and side views of an exemplary lower section of a first embodiment of a sliding ramp.

An exemplary second platform (117) is shown in FIGS. 6 and 7. A second platform can include a foot plate (101), one or more ramp panels (102), and one or more side rails (104). A mounting block (108) can be attached near the end furthest from the foot plate. The mounting block can include a male member, such as a mounting post (112) to engage the guide plate (105) and/or groove (113) of the first platform. The mounting block can also include a notch (115). Alternatively, the mounting plate could include wheels and/or bearings to facilitate operation of the sliding ramp, as well as include a notch, catch, and/or stop mechanism to ensure that the ends of the two platforms marry to form a substantially flush and even work surface when the sliding ramp is in an operational configuration. The second platform can further include a tie bar (109), as shown in FIG. 6.

FIG. 7 shows overhead and side views of a second platform. Mounting block (108) is attached near the end of the second platform furthest from the foot plate (101). The foot plate (101) is shown with handle cut-outs (110), which can facilitate operation of the sliding ramp.

The mounting post (112) can be disposed in the guide plate groove (113) and slide within the groove during operation of the sliding ramp. The guide rail groove (113) drops near the end furthest from the apron. As the second platform slides into an extended position, the groove (113) allows the second platform to drop into an operational position as the mounting post reaches the end of the guide rail groove, and thereby the second platform comes substantially into a plane with the first platform. In the operational position, the notch (115) may engage the ramp post (114) to further strengthen and support the connection of the first platform to the second platform.

In the embodiments described above, the female member is attached to the first platform and the male member is attached to the second platform. However, it should be understood that the locations may be reversed such that the male member is attached to the first platform and the female member is attached to the second platform. Similarly, the sliding ramp described above may use any sliding mechanism that allows the first platform to be slidably coupled with the second platform and is not limited to the guide plate-mounting block system described.

Figure 8:
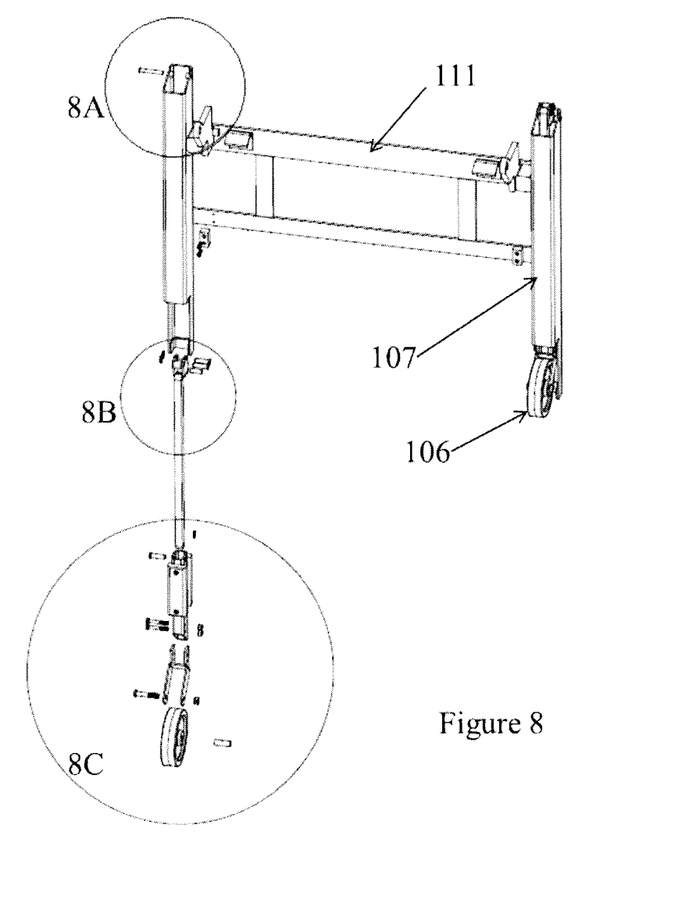
FIG. 8 depicts exemplary leg supports for an embodiment of the system.
Figure 9A:
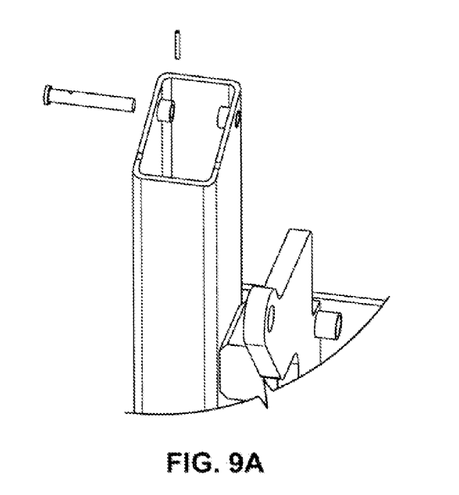
FIG. 9 depicts detailed parts of an exemplary leg support for an embodiment of the system.
Figure 9B:
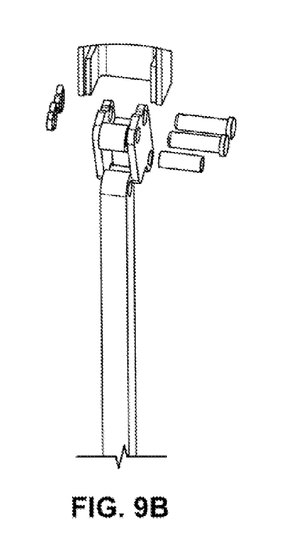
Figure 9C:
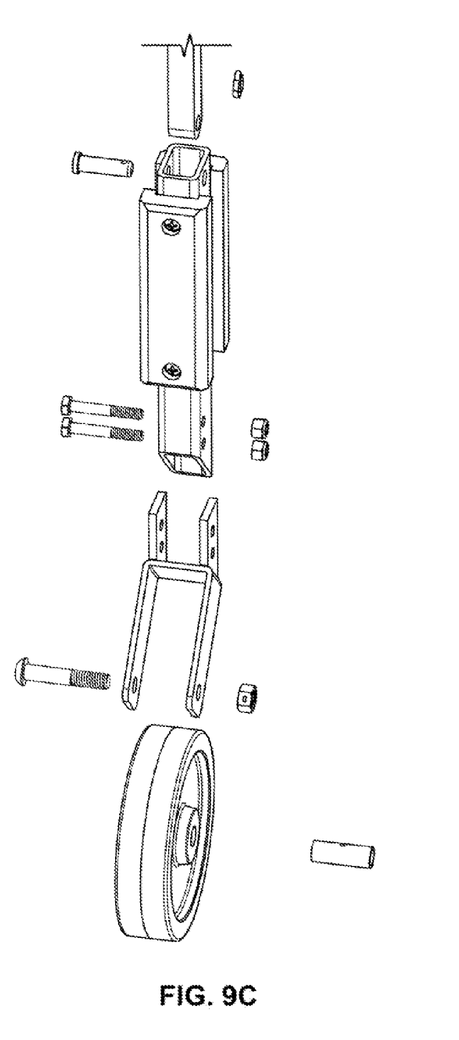

FIGS. 8 and 9 show an exemplary leg support structure. The structure can include one or more wheels (106) and one or more legs (107). In an exemplary embodiment, a leg can have a tubing member. Two or more tubing members can be configured substantially parallel to one another and be rigidly held in their respective position by a support plate weldment (111). Areas 8A-C of FIG. 8 are shown in greater detail in FIG. 9.

Each leg (107) can be equipped with a retracting wheel assembly (106). The wheel assembly can include a rod sized to fit within the leg, as shown in 8B. A guide can be secured to the upper end of rod and a lower guide can be secured to the lower end of each rod. Each guide can be held on a rod with a retaining pin arrangement and each can be dimensioned to fit within the tubing members so that they can freely slide therewithin. Each lower guide can have a caster coupled thereto, such as with a plurality of bolts, as shown in 8C. The caster and its associated wheel can be dimensioned so that they also fit within hollow tubing member. Stops can be provided within tubing members to prevent the respective wheel assembly from leaving the tubing member, for example by a rivet or bolt that would limit the movement of the guides. The leg support structure can be pivotally coupled to one or more of the first and second platforms.

To use the sliding ramp, the end of the first platform is attached to a vehicle. The user slides the second platform relative to the first platform until the second platform does not overlie the first platform and the two platforms form a substantially continuous and co-planar walking surface. The leg supports are then folded down so that they contact the ground. The ramp is then in a position to load or unload cargo from the vehicle. To store the sliding ramp, the process is reversed. The leg supports are folded into the stored position and the user slidably moves the second platform relative to the first platform until the second platform substantially overlies the first platform.

Figure 10:
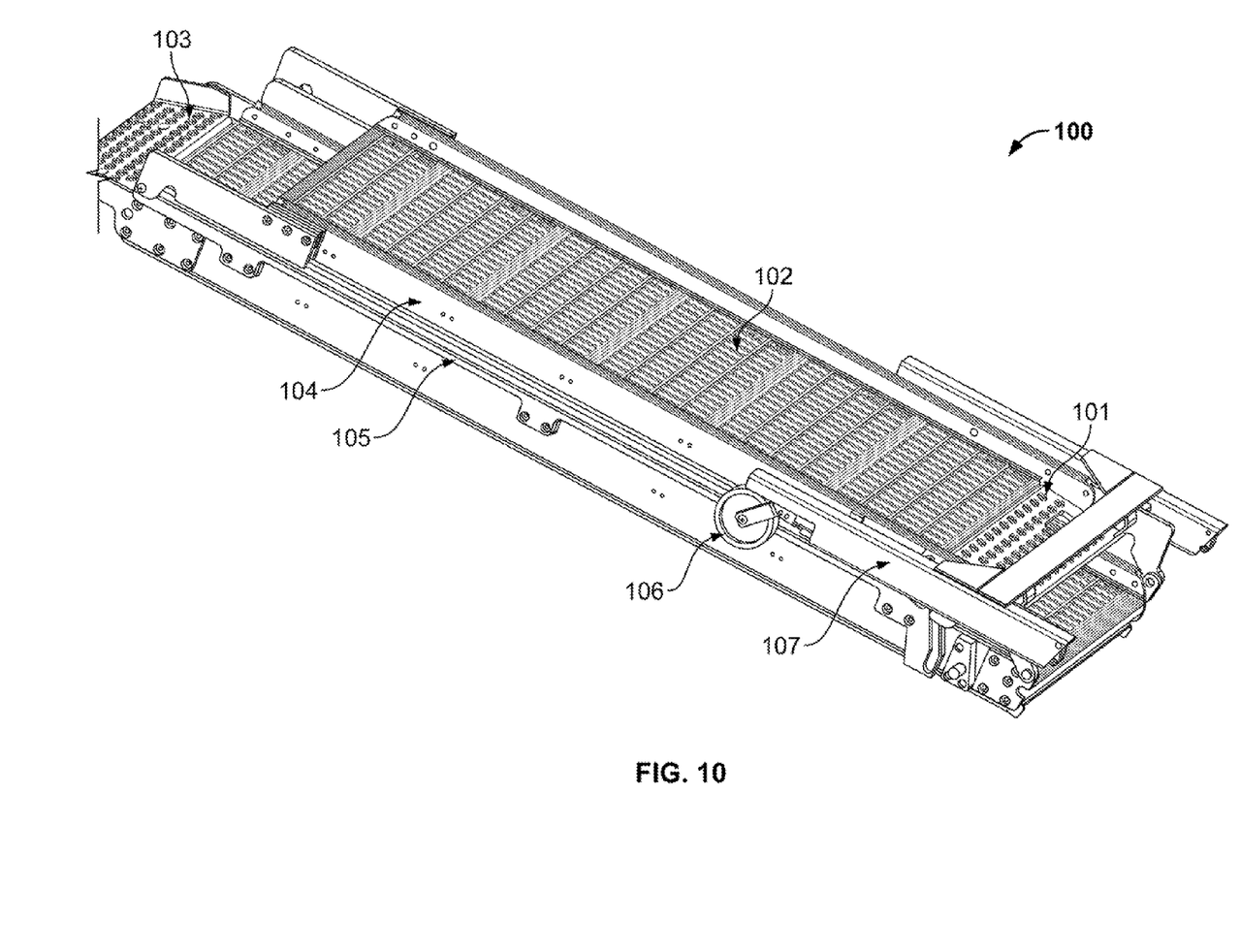
FIG. 10 depicts a second embodiment of a sliding ramp.

FIG. 10 shows an alternative embodiment of a sliding ramp in accordance with the present invention.

Embodiments have been described herein in exemplary forms for instructing a person of ordinary skill in the art. Such embodiments and/or forms are not intended to limit the following claims to specific structures or steps. Other embodiments can be practiced and/or implemented without departing from the scope and spirit of the invention. Other embodiments are within the scope of the following claims.

What is claimed is:

1. A sliding ramp comprising:
    a first platform, the first platform including one or more panels defining a first walking surface and a pair of spaced first side rails, each first side rail having an interior edge that faces the interior edge of the other first side rail; and
    a second platform, the second platform including one or more panels defining a second walking surface and a pair of spaced second side rails, each second side rail having an interior edge that faces the interior edge of the other second side rail,
    wherein the second platform is slidably coupled to the first platform and the second platform is adapted to be slid relative to the first platform between a storage position and an extended position such that,
    in the storage position, at least a portion of the second walking surface overlies at least a portion of the first walking surface in a direction that is normal to the first walking surface, and
    in the extended position, no portion of the second walking surface overlies the first walking surface in the direction that is normal to the first walking surface and each interior edge of the first side rail is substantially collinear with an interior edge of a second side rail.

2. The sliding ramp of claim 1, further comprising a leg support structure that is coupled to one of the first platform and the second platform.

3. The sliding ramp of claim 2, wherein the leg support structure further includes a pair of spaced, substantially parallel tubing members, each tubing member having a wheel coupled to the leg support structure.

4. The sliding ramp of claim 3, wherein the wheel is slidably and retractably coupled to the leg support structure.

5. The sliding ramp of claim 1, wherein the first platform includes a female member and the second platform includes a male member, and the male member engages the female member to facilitate a sliding relationship between the first platform and the second platform.

6. The sliding ramp of claim 5, wherein the female member includes a groove and the male member includes a post, and the post engages the groove.

7. The sliding ramp of claim 1, wherein the second platform includes a female member and the first platform includes a male member, and the male member engages the female member to facilitate a sliding relationship between the first platform and the second platform.

8. The sliding ramp of claim 7, wherein the female member includes a groove and the male member includes a post, and the post engages the groove.

9. The sliding ramp of claim 1, wherein the first platform includes a first platform loading end and a first platform coupling end;
wherein the second platform includes a second platform loading end and a second platform coupling end; and
in the extended position, the first platform coupling end does not overlie the second platform coupling end in a direction that is normal to the first walking surface.

10. The sliding ramp of claim 9, further comprising:
a first coupling component attached to the first platform coupling end;
a second coupling component attached to the second platform coupling end; and
wherein in the extended position, the first coupling component couples to the second coupling component.

* * * * *